May 1, 1934.  H. E. McCRAY  1,957,221
TRACTOR
Filed Nov. 23, 1928   2 Sheets-Sheet 1

WITNESS
Walter Ackerman

INVENTOR
Harold E. McCray
BY
Brown, Jackson, Boettcher & Dienner
ATTORNEYS

May 1, 1934.  H. E. McCRAY  1,957,221
TRACTOR
Filed Nov. 23, 1928   2 Sheets-Sheet 2
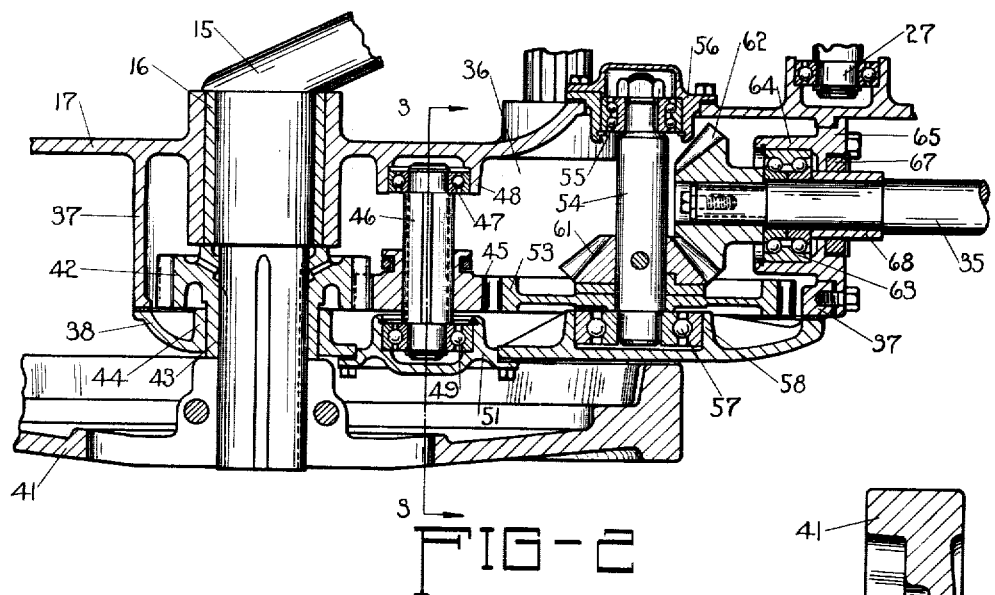
FIG-2
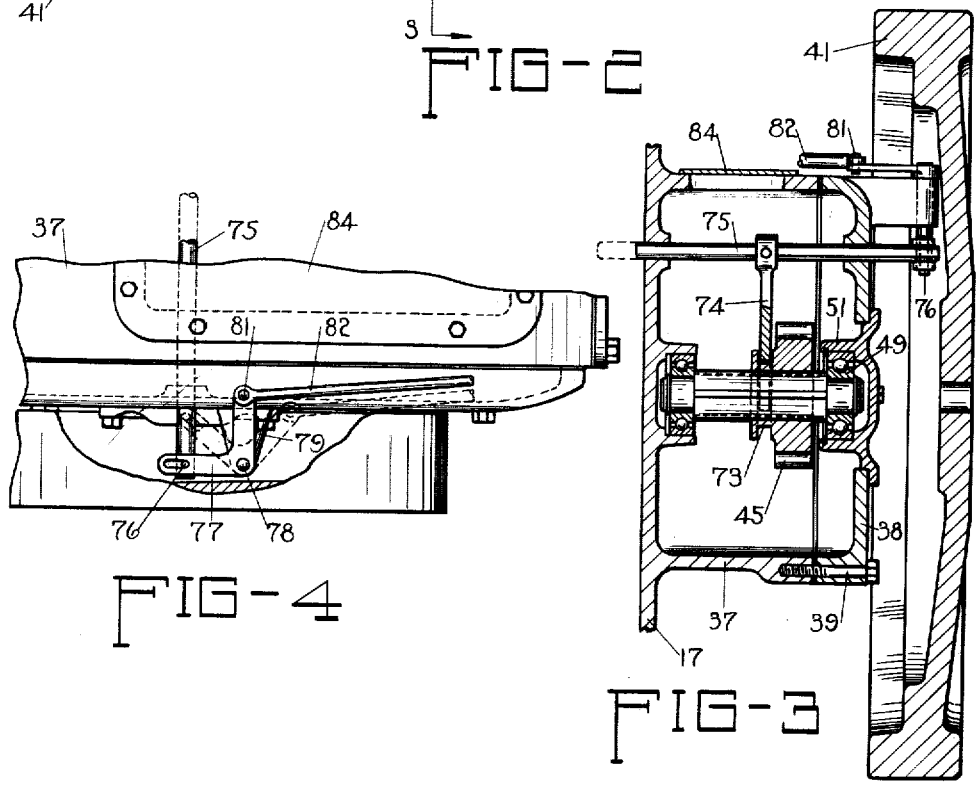
FIG-4
FIG-3
WITNESS
Walter Ackerman
INVENTOR
Harold E. McCray
BY
Brown, Jackson, Boettcher & Dienner
ATTORNEYS Patented May 1, 1934

1,957,221

UNITED STATES PATENT OFFICE 1,957,221

TRACTOR

Harold E. McCray, Waterloo, Iowa, assignor to John Deere Tractor Company, Waterloo, Iowa, a corporation of Iowa Application November 23, 1928, Serial No. 321,295

22 Claims. (Cl. 180—53)

The present invention relates to tractors, and has particular reference to the provision of improved power take-off mechanism on tractors. These power take-off connections are now extensively used on tractors for transmitting power from the motor of the tractor to operate various moving parts on the implement being propelled by the tractor, such, for example, as the harvesting and thrashing parts of combines, the seed feeding mechanisms of planters, the apron and beater cylinders of manure spreaders, etc.

One of the principal objects of the invention is to provide an improved power take-off mechanism which is capable of transmitting power to the driven parts of the implement independently of the propulsion of the implement so that this power transmission can be made to occur while the implement and tractor are standing stationary. The desirability of this independent operation arises particularly in the case of implements having rapidly moving parts, or parts having heavy inertia, which must be brought up to speed before the implement can operate effectively. For example, in combines the thresher cylinder, blower fans, etc., must be brought up to speed before the implement has any operating efficiency. In prior take-off connections which are only operative to transmit power to the implement while the tractor is in motion, it is necessary after stopping the combine to back up the implement a considerable distance in order to allow the above mentioned parts to be brought up to speed before the harvesting and threshing operation is again started. Moreover, in pulling a heavy implement up sloping ground, if it is necessary to stop the implement, it frequently develops that the tractor does not have sufficient power to start the operating parts of the implement and also to start the propulsion of the implement at the same time.

The present invention avoids these difficulties by enabling the power take-off drive to be thrown into operation before the tractor starts, thereby permitting the static friction of the operating parts of the implement to be overcome and these parts brought up to an effective speed before the implement is set into motion.

Other objects of the invention are to provide an improved arrangement of driving mechanism between the crank shaft of the tractor motor and the power take-off shaft, including means for interrupting the drive to the take-off shaft; to provide an improved housing construction which disposes this driving mechanism in an individual compartment separate from the crank case and transmission compartment of the tractor; and to adapt the present power take-off mechanism to a design of tractor wherein the engine crank shaft extends transversely of the tractor.

Other objects and advantages of the invention will appear in the following description of a preferred embodiment thereof. In the accompanying drawings illustrating such embodiment:

Figure 2 is a horizontal sectional view on a larger scale through the portion of housing which encloses the driven mechanism for the power take-off shaft;

Figure 3 is a fragmentary vertical sectional view taken on the plane of the line 3—3 of Figure 2; and Figure 4 is a fragmentary plan view of the latter housing portion illustrating the operating connections which serve to connect and disconnect the power transmission train to the take-off shaft.

Figure 1:
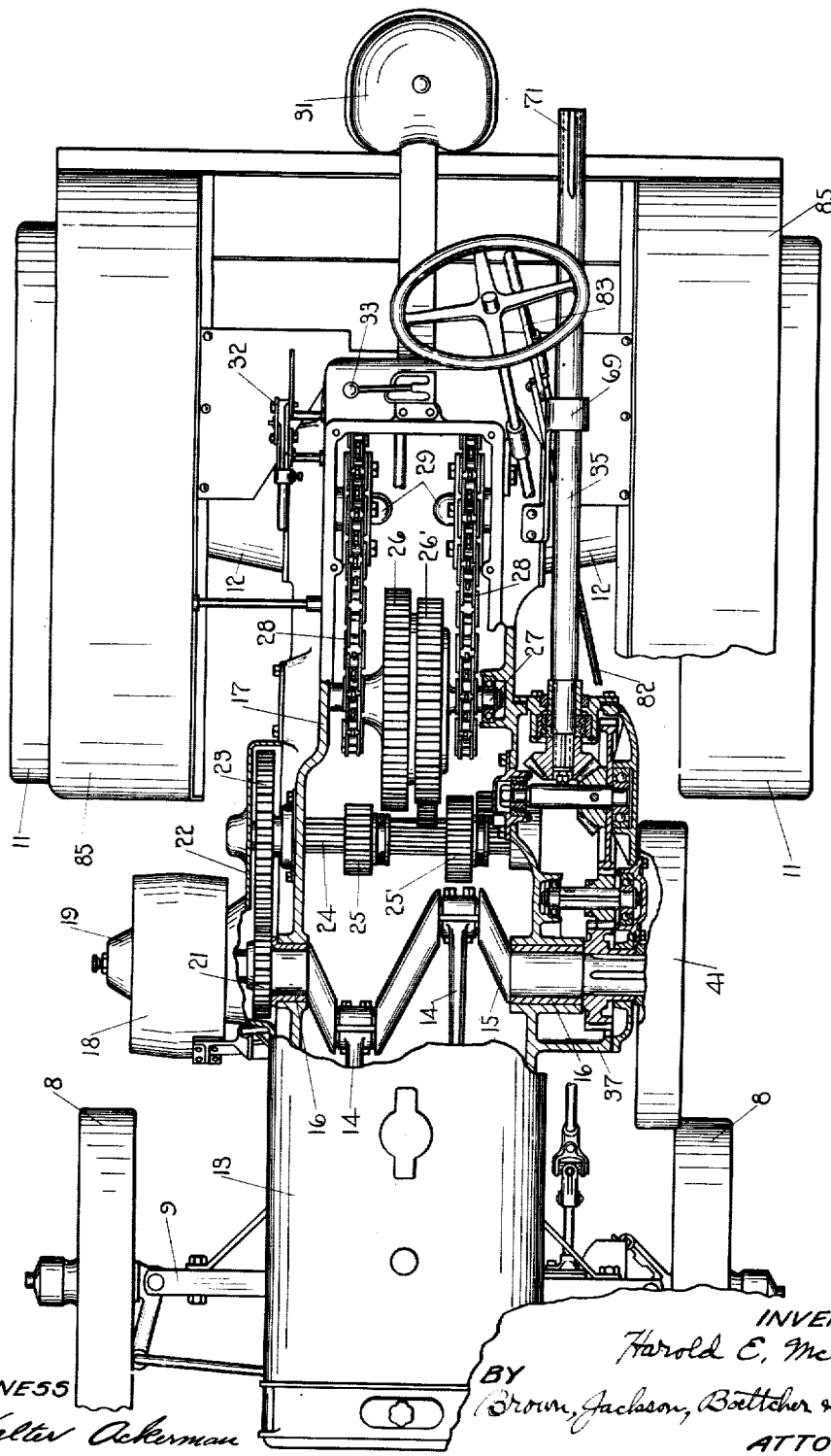
Figure 1 is a fragmentary plan view of the tractor, part of the housing structure being broken away to illustrate the relation between the engine crank shaft, the transmission mechanism, and the power take-off shaft.

The tractor comprises front steering wheels 8 mounted on a front axle 9, and rear traction wheels 11 mounted on axles within rear axle housings 12. One of the features of the invention resides in the adaptation of the present power take-off mechanism to a horizontal engine type of tractor wherein the engine crank shaft extends transversely of the tractor, and accordingly I shall describe the invention in this embodiment, although it will be understood that the invention is not necessarily limited thereto. In such embodiment the engine comprises two or more horizontally extending cylinders, the same not appearing in Figure 1 as they are disposed below the superposed fuel tank 13. Extending from the pistons in said cylinders are connecting rods 14 which have connection with the cranks of the crank shaft 15 extending transversely of the tractor. The crank shaft is journaled in bearings 16 mounted in the side walls of a housing 17 which constitutes the main frame of the tractor.

This housing extends back to the rear end of the tractor and has the rear axle housings 12 bolted to its sides. The selective speed transmission mechanism and the chain drive to the rear axles is enclosed entirely within this housing.

At one side of the tractor the crank shaft 15 projects beyond the side wall of the housing 17 and has a pulley 18 mounted thereon for driving a belt when the tractor is being employed for belt work. Embodied within this belt pulley is a control clutch, a portion of which is indicated at 19, which controls the transmission of power to the belt pulley 18 and which also controls the transmission of power to the selective speed transmission mechanism and thence back to the rear traction wheels. In the exercise of this latter control, the clutch governs the transmission of power from the crank shaft 15 to a spur gear 21 which has a sleeve mounting on the crank shaft within a removable outer housing 22 secured to the side of the main housing 17. Meshing with this gear within said outer housing is a large spur gear 23 which is mounted on the projecting end of a transversely extending transmission shaft 24 journaled in the side walls of the main housing 17. Mounted on this latter shaft are two speed selecting gears 25, 25' which are shiftable into and out of mesh with two large spur gears 26, 26' and with a reversing pinion which meshes with one of the latter gears. These large gears are rotatably supported on a transverse shaft 27 journaled in the side walls of the housing 17, and drive through differential gearing, not shown, to two sprocket wheels over which are trained sprocket chains 28.

Said chains pass around large sprocket wheels mounted on stub axles, indicated at 29, which stub axles extend outwardly through the rear axle housings 12 and have driving connection with the rear traction wheels 11. The operator's seat 31 is located at the rear of the tractor, and arranged in proximity thereto is a clutch control device 32 operatively connected with the clutch 19, and a gear shift lever 33 operatively connected with the shiftable transmission gears 25, 25'.

I have not described in detail all of the power transmission train which propels the tractor because such in and of itself does not constitute part of the present invention, and is clearly disclosed in the copending application of Louis W. Witry, Serial No. 682,401, filed December 24, 1923. It will be apparent from the foregoing description, however, that one end of the transverse crank shaft 15 transmits power to the belt pulley at one side of the tractor for belt work, and also transmits the propelling power which is transmitted through the selective speed mechanism back to the rear traction wheels. The other end of the crank shaft 15, at the other side of the tractor, transmits the power to the power take-off shaft indicated at 35, as I shall now describe.

Referring particularly to Figure 2, it will be seen that this end of the crank shaft extends into a separate compartment 36 formed within a housing extension 37 which is preferably integral with the main housing 17 and projects laterally from the side thereof.

The outer side of said housing extension 37 is cast open, being closed by a side cover plate 38 which is removably secured to the housing extension by cap screws or bolts 39 (see Fig. 3). The crank shaft is provided with a lateral extension projecting through the side cover plate 38 and has the engine fly wheel 41 secured to its outer end. Keyed to the crank shaft extension within the housing 37 is a driving spur gear 42 which has a bearing portion 43 extending along the shaft and journaled in a bearing boss 44 formed in the cover plate 38. The driving spur gear 42 meshes with an idler pinion 45 which is splined or keyed for shiftable movement along a counter shaft 46. The inner end of the latter shaft is mounted in an antifriction bearing 47 supported in a boss 48 projecting inwardly from the wall of the main housing 17, and the outer end of said shaft is mounted in an antifriction bearing 49 which is supported in a removable cap or plate 51 bolted to the side cover plate 38. The opening closed by the bearing supporting plate 51 is preferably made sufficiently large to permit insertion and removal of the idler pinion 45 through this opening.

The idler pinion meshes with a driven spur gear 53, preferably of relatively large diameter, which is mounted on a second counter shaft 54 also extending transversely of the housing 37. The inner end of the latter counter shaft is mounted in an antifriction bearing 55 supported in a removable bearing ring or cage 56 bolted in an opening in the wall of the main housing 17. The outer end of this counter shaft is mounted in an antifriction bearing 57 which is supported in a boss 58 projecting inwardly from the side cover plate 38.

Secured on this secondary countershaft 54 and rigidly connected with the driven gear 53 is a bevel gear 61 which faces inwardly for meshing with a companion bevel gear 62 mounted on the power take-off shaft 35 which enters the end of the housing 37 on the inner side of the driven spur gear 53. Supporting the bevel gear 62 and this end of the power take-off shaft is an antifriction bearing 63 which is mounted in a boss 64 formed on a removable bearing plate or cap 65 which is bolted or otherwise secured to the end of the housing 37. The opening which this bearing plate covers is sufficiently large to permit the insertion and removal of the bevel gear 62 therethrough. A felt ring or other suitable packing 67 is recessed in the bearing plate 65 around a shaft bushing 68 for preventing the loss of lubricant along the surface of the shaft. Said shaft extends back to the rear portion of the tractor and has secondary bearings support in a bearing bracket 69 secured to the main housing 17 (Fig. 1). The rear end of said shaft is splined as indicated at 71 or is otherwise arranged for effecting ready coupling to an extension shaft extending back to the operating parts of the implement.

The connection and disconnection of the drive to said power take-off shaft is effected through shifting the idler pinion 45 into and out of mesh with the driven spur gear 53. Referring to Figures 3 and 4, it will be seen that this idler pinion is formed with an annularly grooved collar 73 on its inner side, and engaging in the groove thereof is a shifting fork 74.

Such fork is rigidly mounted on a shifting rod 75 which has slidable mounting in openings in the housing wall 17 and in the side cover plate 38. The outer end of said rod projects beyond the cover plate and carries a pin 76 which engages in the slotted arm of a bell crank lever 77 (Fig. 4). Such lever is pivoted at 78 on a bracket 79 projecting laterally from the side cover plate 38, the recessed inner side of the fly wheel 41 accommodating the bell crank lever 77 and bracket arm 79. Pivotally connected at 81 to the other arm of this bell crank lever is an operating rod 82 which extends back to an operating lever 83 disposed in proximity to the operator's seat 31. The lever 83 may be provided with any suitable detent or latch mechanism for holding it in its two positions with the idler pinion 45 in or out of mesh with the driven gear 53. It will be noted that the driving gear 42 has a relatively wide face so that the idler pinion 45 will remain in mesh therewith after it has been shifted out of operative engagement with the driven gear 53.

It will be seen from the foregoing that the present construction establishes a direct driving relation between the engine crank shaft 15 and the power take-off shaft 35 entirely independently of the selective speed transmission mechanism 25—26' so that power can be transmitted to the take-off shaft independently of the propulsion of the tractor.

Hence, if the operator desires to bring the operating parts of the implement up to speed before setting the implement into motion he shifts the idler pinion 45 into operative mesh while the clutch 19 or the selective speed transmission mechanism is disengaged, thereby enabling the full power of the tractor engine to be utilized for bringing the implement parts up to speed. Thereupon the propelling train to the tractor wheels 11 can be completed through the clutch 19 and the selective speed mechanism for gradually setting the tractor and implement into motion. By enclosing the driving train which connects the crank shaft 15 with the power take-off shaft 35 in a separate housing compartment 36 a separate body of lubricant can be retained in contact with the driving gears independently of any variation of the level or supply of lubricant in the crank case and in that portion of the main housing in which the selective speed transmission mechanism is enclosed. A top cover plate 84 may be removably mounted to close an opening in the top wall of the housing extension 37 (Figures 3 and 4), through which lubricant may be supplied to this separate compartment 36 and through which access may be gained to the driving train therein. It will also be observed that this driving train between the crank shaft and the power take-off shaft is of relatively compact dimension transversely of the tractor so that the fly wheel 41 does not project objectionably from the side of the tractor and so that the power-take-off shaft 35 can be extended longitudinally of the tractor in convenient position above the adjacent rear axle housing 12 and on the inner side of the adjacent fender 85 which extends over each traction wheel 11.

Having thus described my invention what I claim as new and desire to secure by Letters Patent is:

1. In a tractor, the combination of a motor having a crank shaft, a main power transmitting means adapted to be operatively connected with said crank shaft, traction wheels driven by said main power transmitting means, and a power take-off shaft for driving implement parts at the rear of said tractor, and adapted to be operatively connected with said crank shaft through an auxiliary power transmitting means separate from the aforesaid main power transmitting means whereby said power take-off shaft can be operated independently of the transmission of power to said traction wheels through said main power transmitting means.

2. In a tractor, the combination of a motor having a crank shaft, a main drive clutch, selective speed transmission mechanism deriving its power from said crank shaft through said clutch, traction wheels arranged to be driven from said transmission mechanism, a power take-off shaft for driving implement parts associated with the tractor, and intermediate gearing for operatively connecting said power take-off shaft directly with said crank shaft independently of said main drive clutch whereby said power take-off shaft can be driven independently of the transmission of power to said traction wheels.

3. In a tractor, the combination of a motor having a crank shaft, a main drive clutch, selective speed transmission mechanism deriving its power from and connected with one portion of said crank shaft through said clutch, traction wheels arranged to be driven from said transmission mechanism, a power take-off shaft for driving implement parts associated with the tractor, and intermediate transmission mechanism operatively connecting said power take-off shaft directly with another portion of said crank shaft independently of the drive through said main drive clutch whereby said take-off shaft can be driven independently of the transmission of power to said traction wheels, said intermediate transmission mechanism being disconnectible for controlling the operation of said take-off shaft.

4. In a tractor, the combination of a motor having a crank shaft, transmission mechanism operatively connected to be driven from one end of said crank shaft, traction wheels connected to be driven from said transmission mechanism, and a power take-off shaft rotatably mounted on the tractor and extending longitudinally thereof for driving implement parts connected with said tractor, said power take-off shaft being operatively connected to be driven from the other end of said crank shaft at the same time or independently of said transmission mechanism.

5. In a tractor, the combination of a motor having a crank shaft extending substantially transversely of the tractor, transmission mechanism operatively connected to be driven from one end of said crank shaft, traction wheels connected to be driven from said transmission mechanism, and a power take-off shaft extending substantially longitudinally of the tractor and operatively connected to be driven from the other end of said crank shaft.

6. In a tractor, the combination of a power shaft extending substantially transversely of the tractor, transmission mechanism deriving its power from one end of said power shaft, traction wheels driven from said transmission mechanism, and a power take-off shaft extending substantially longitudinally of the tractor and operatively connected to be driven from the other end of said transverse power shaft.

7. In a tractor, the combination of a power shaft extending substantially transversely of the tractor, transmission mechanism deriving its power therefrom, traction wheels driven from said transmission mechanism, a belt pulley operatively connected to be driven from one end of said transverse power shaft, and a power take-off shaft operatively connected to be driven from the other end of said transverse power shaft.

8. In a tractor, the combination of a housing, a motor having a crank shaft disposed in said housing, selective speed transmission mechanism in said housing operatively connected to derive its power from said crank shaft, traction wheels, drive mechanism operatively connecting said transmission mechanism with said traction wheels, a secondary housing disposed on the outer side of said first mentioned housing, said crank shaft extending into said secondary housing, a power take-off shaft extending into said secondary housing, and intermediate transmission mechanism operatively connecting said crank shaft with said power take-off shaft, said intermediate transmission mechanism comprising disconnectible means for controlling the operation of said power take-off shaft.

9. In a tractor, the combination of traction and steering wheels, a main housing extending longitudinally of the tractor, a motor having a crank shaft disposed in said housing and extending transversely thereof, selective speed transmission mechanism in said housing, drive means operatively connecting said transmission mechanism with the traction wheels, means for driving said transmission mechanism from one end of said crank shaft, a secondary housing disposed outside of said main housing, the other end of said crank shaft extending into said secondary housing, a power take-off shaft extending substantially longitudinally of the tractor and entering said secondary housing, and gear mechanism for operatively connecting said crank shaft with said power take-off shaft within said secondary housing, said gear mechanism comprising disconnectible means for controlling the operation of said power take-off shaft.

10. In a tractor, the combination of power operated traction wheels, a housing, a motor having its crank shaft disposed in said housing, transmission gearing in said housing and operatively connected with the traction wheels, means outside of said housing for operatively connecting said crank shaft with said transmission gearing, a power take-off shaft extending substantially longitudinally of the tractor, and means independent of the transmission gearing and outside of said housing for operatively connecting said crank shaft with said power take-off shaft.

11. In a tractor, the combination of power operated traction wheels, a housing extending substantially longitudinally of the tractor, a motor having a crank shaft disposed in said housing and extending transversely thereof, selective speed transmission gearing in said housing and operatively connected with the traction wheels, means outside of said housing comprising a clutch for operatively connecting one end of said crank shaft with said transmission gearing, a power take-off shaft extending substantially longitudinally of the tractor, and means outside of said housing for operatively connecting the other end of said crank shaft with said power take-off shaft.

12. In a tractor, the combination of a motor, a clutch driven by said motor, selective speed transmission mechanism driven by said clutch, traction wheels driven by said transmission mechanism, a power take-off shaft, and means deriving its power directly from said motor independently of said clutch and said transmission mechanism, and connected with said power take-off shaft whereby said shaft can be driven when said clutch and said transmission are disengaged.

13. In a tractor, the combination of a motor, a power shaft driven thereby, a clutch driven by said power shaft, selective speed transmission mechanism deriving its power from said clutch, traction wheels driven from said transmission mechanism, a power take-off shaft, and drive means independent of said transmission mechanism and said clutch for driving said power take-off shaft from the power shaft of said motor whereby said power take-off shaft can be operated while said selective speed transmission mechanism is disengaged, said drive mechanism comprising means for stopping and starting said power take-off shaft.

14. In a tractor, the combination of traction wheels, a motor, transmission mechanism operatively connected to transmit the power of said motor to said traction wheels, a power shaft deriving its power from said motor, a power take-off shaft extending substantially at right angles to said power shaft, a bevel gear connected to drive said power take-off shaft, a counter shaft, a cooperating bevel gear on said counter shaft meshing with said first mentioned bevel gear, and cooperating gears operatively connecting the latter bevel gear with said power shaft, one of said cooperating gears being shiftable out of mesh to interrupt the transmission of power to said take-off shaft.

15. In a tractor, the combination of traction wheels, a motor, a clutch and selective speed transmission mechanism operatively connected to transmit the power of said motor to said traction wheels, a power shaft deriving its power from the motor, a power take-off shaft extending substantially at right angles to said power shaft, two counter shafts, intermeshing gears on said counter shafts, a gear on said power shaft driving said intermeshing gears, means for shifting one of said gears relatively to another for interrupting the transmission of power to said take-off shaft, a bevel gear on one of said counter shafts, and a cooperating bevel gear on said power take-off shaft meshing therewith.

16. In a tractor, the combination of traction wheels, a motor, a clutch and selective speed transmission mechanism operatively connected to transmit power from said motor to said traction wheels, a drive shaft deriving its power from said motor, a power take-off shaft, a gear connected to be driven by said drive shaft, a gear connected to drive said power take-off shaft, and an intermediate gear adapted to establish power transmitting relation between said first mentioned gears, said intermediate gear being shiftable into and out of mesh with one of said first mentioned gears.

17. In a tractor, the combination of traction wheels, a motor, a clutch and transmission mechanism for transmitting the power of said motor to said traction wheels, a shaft deriving its power directly from the motor and independently of said transmission mechanism, a power take-off shaft for driving implement parts at the rear of the tractor, and extending substantially at right angles to said first shaft, and drive mechanism comprising cooperating bevel gears for operatively connecting said shafts.

18. In a tractor, the combination of a motor, traction wheels, and a power take-off shaft for driving implement mechanisms at the rear of the tractor, a first driving means operatively connecting said traction wheels directly with said motor and a second driving means completely independent of said first driving means for operatively connecting said power take-off shaft directly with said motor.

19. In a tractor, the combination of a motor, traction wheels, and a power take-off shaft for driving implement mechanisms at the rear of the tractor, a first driving means operatively connecting said traction wheels directly with said motor, a second driving means completely independent of said first driving means for operatively connecting said power take-off shaft directly with said motor, and a first control means for controlling the transmission of power from said motor to said traction wheels and a second control means for controlling the transmission of power from said motor to said power take-off shaft, whereby said traction wheels and said power take-off shaft may be operated independently or simultaneously at will.

20. In a tractor, the combination of a motor having a crank shaft, transmission mechanism adapted to be driven therefrom, a housing defining a compartment for said transmission mechanism, a secondary compartment separated from the transmission compartment, a crank shaft extension disposed in axial alignment with said crank shaft and including a portion journaled for rotation in said secondary compartment, a countershaft also disposed in said secondary compartment and connected by gear means with said crank shaft extension, said gear means being disposed in said secondary compartment and including shiftable means for optionally interrupting the drive from the crank shaft to said countershaft, a power take-off device including a shaft disposed in said secondary compartment and connected to be driven from said countershaft, and means for controlling said optionally shiftable means.

21. In a tractor, the combination of a motor having a crank shaft, transmission mechanism adapted to be operated therefrom, a housing defining a compartment for said transmission mechanism, a secondary compartment separated from said transmission compartment, means serving as a shaft extension of the motor crank shaft and being driven thereby, said shaft extension being disposed in said secondary housing, a gear member mounted thereon, a countershaft disposed in said secondary housing and adapted to be driven from said gear, said countershaft being disposed in parallel relation with respect to said shaft extension, a shaft extending into said secondary compartment and gear connected with said countershaft, said shaft being disposed at right angles to said countershaft, and means for controlling the connection between said shaft extension and said countershaft for establishing or interrupting the drive to said countershaft.

22. In a tractor, the combination of a motor including a crank shaft, transmission mechanism adapted to be driven therefrom, a housing defining a compartment for said transmission mechanism, a secondary compartment separated from said transmission compartment, means serving as a shaft extension of the motor crank shaft and disposed in axial alignment therewith to be driven thereby, a countershaft journaled for rotation in said secondary compartment, a shaft member also journaled for rotation in said secondary compartment and extending at substantially right angles to said countershaft, and means including an optionally controlled sliding gear disposed in said secondary compartment for optionally transmitting the drive between said shaft extension and the countershaft.

HAROLD E. McCRAY.

CERTIFICATE OF CORRECTION.

Patent No. 1,957,221.

May 1, 1934.

HAROLD E. McCRAY.

It is hereby certified that error appears in the printed specification of the above numbered patent requiring correction as follows: Page 3, line 19, for "tractor" read traction; page 4, line 8, claim 9, strike out the word "on"; and that the said Letters Patent should be read with these corrections therein that the same may conform to the record of the case in the Patent Office.

Signed and sealed this 19th day of June, A. D. 1934.

Bryan M. Battey (Seal)

Acting Commissioner of Patents.

take-off shaft may be operated independently or simultaneously at will.

20. In a tractor, the combination of a motor having a crank shaft, transmission mechanism adapted to be driven therefrom, a housing defining a compartment for said transmission mechanism, a secondary compartment separated from the transmission compartment, a crank shaft extension disposed in axial alignment with said crank shaft and including a portion journaled for rotation in said secondary compartment, a countershaft also disposed in said secondary compartment and connected by gear means with said crank shaft extension, said gear means being disposed in said secondary compartment and including shiftable means for optionally interrupting the drive from the crank shaft to said countershaft, a power take-off device including a shaft disposed in said secondary compartment and connected to be driven from said countershaft, and means for controlling said optionally shiftable means.

21. In a tractor, the combination of a motor having a crank shaft, transmission mechanism adapted to be operated therefrom, a housing defining a compartment for said transmission mechanism, a secondary compartment separated from said transmission compartment, means serving as a shaft extension of the motor crank shaft and being driven thereby, said shaft extension being disposed in said secondary housing, a gear member mounted thereon, a countershaft disposed in said secondary housing and adapted to be driven from said gear, said countershaft being disposed in parallel relation with respect to said shaft extension, a shaft extending into said secondary compartment and gear connected with said countershaft, said shaft being disposed at right angles to said countershaft, and means for controlling the connection between said shaft extension and said countershaft for establishing or interrupting the drive to said countershaft.

22. In a tractor, the combination of a motor including a crank shaft, transmission mechanism adapted to be driven therefrom, a housing defining a compartment for said transmission mechanism, a secondary compartment separated from said transmission compartment, means serving as a shaft extension of the motor crank shaft and disposed in axial alignment therewith to be driven thereby, a countershaft journaled for rotation in said secondary compartment, a shaft member also journaled for rotation in said secondary compartment and extending at substantially right angles to said countershaft, and means including an optionally controlled sliding gear disposed in said secondary compartment for optionally transmitting the drive between said shaft extension and the countershaft.

HAROLD E. McCRAY.

CERTIFICATE OF CORRECTION.

Patent No. 1,957,221.

May 1, 1934.

HAROLD E. McCRAY.

It is hereby certified that error appears in the printed specification of the above numbered patent requiring correction as follows: Page 3, line 19, for "tractor" read traction; page 4, line 8, claim 9, strike out the word "on"; and that the said Letters Patent should be read with these corrections therein that the same may conform to the record of the case in the Patent Office.

Signed and sealed this 19th day of June, A. D. 1934.

Bryan M. Battey (Seal)

Acting Commissioner of Patents.